Dec. 16, 1958     R. MELDRUM     2,864,645
TONGS
Filed Aug. 3, 1953
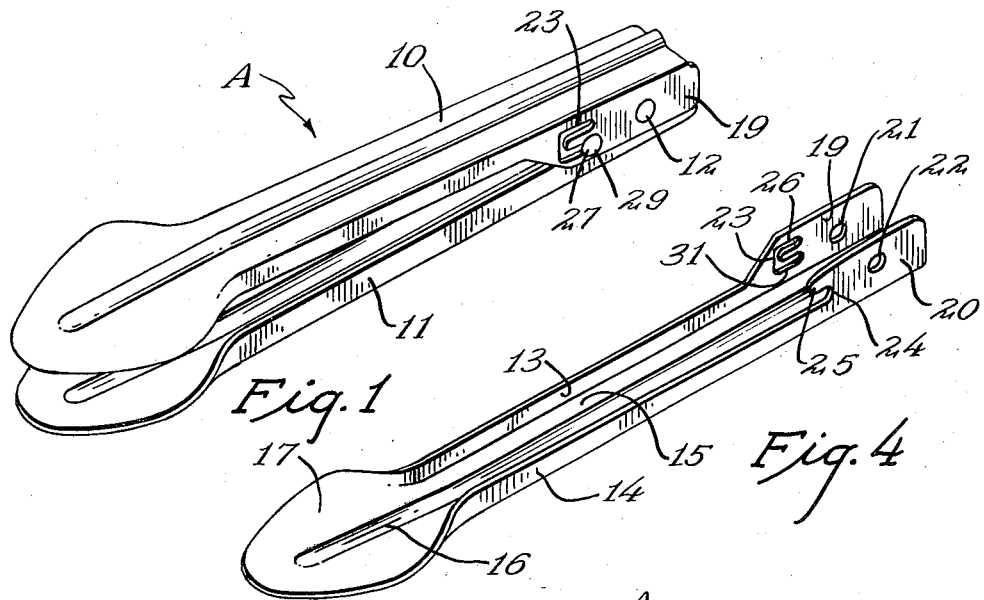
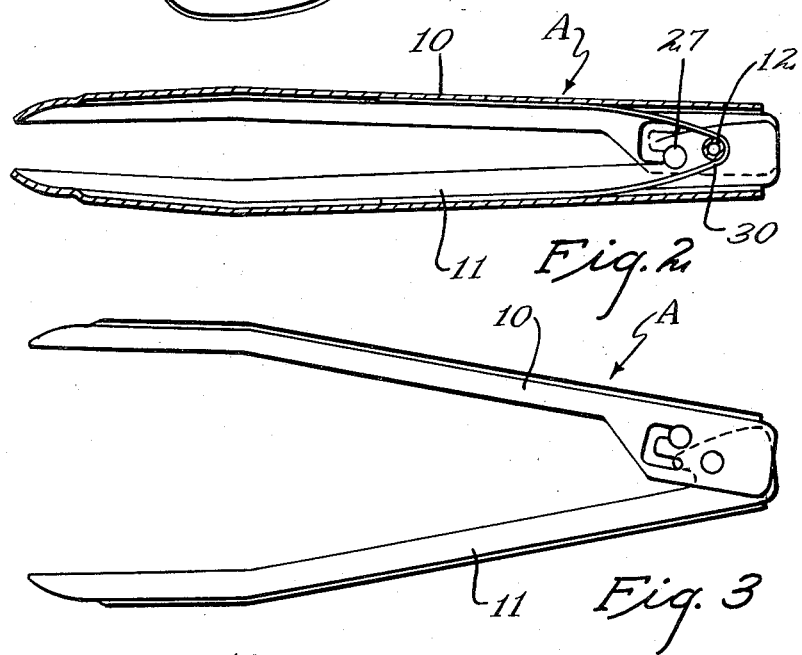
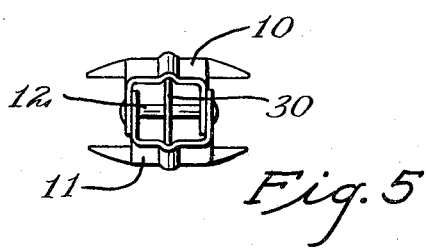
INVENTOR
Roy Meldrum
BY Robert M. Dunning
ATTORNEY

United States Patent Office

2,864,645
Patented Dec. 16, 1958

2,864,645

TONGS

Roy Meldrum, St. Paul, Minn.

Application August 3, 1953, Serial No. 372,118

3 Claims. (Cl. 294—106)

This invention relates to an improvement in tongs and deals particularly with the type of tongs used as a kitchen utensil and for handling food products and the like.

Various types of tongs have been provided for handling food production of one type or another. These tongs normally include a pair of arms which are hingedly connected near one end thereof and which are normally urged apart by springs or the like. These tongs are normally provided with enlarged ends which may be shaped to simulate a spoon or fork and are designed to engage an object or body of material therebetween.

One of the difficulties often experienced with tongs of this type lies in the fact that the tong arms are normally resiliently urged apart and as a result they take up considerable space in a drawer or receptacle used for containing such items. In many instances it has been found that the housewife will place a rubber band about the tongs to hold them in closed position during storage. The use of such a band is neither sanitary or convenient. An object of the present invention resides in the provision of a pair of tongs of the type described but which are provided with a locking means by means of which the tong arms may be locked together when not in use. This locking means is extremely simple in form and requires substantially no additional cost in construction or assembly but functions effectively for its intended purpose.

A feature of the present invention resides in the provision of a pair of tongs having a locking means which may, as desired, function automatically to lock the tong arms together. This structure may, if desired, operate by gravity so that if the tongs are held in an upright position with their pivoted ends extending downwardly, the tong arms will lock together when pressed together. The tong arms may be unlocked at any time by merely holding the hinged ends of the tong arms upwardly and applying a slide pressure tending to urge the arms together and to release the locking means.

These and other objects and novel features of the invention will be more clearly and fully set forth in the accompanying claims.

In the drawings forming part of the specification:

Figure 1 is a perspective view of the tongs in closed position.

Figure 2 is a longtudinally sectional view through the tongs of Figure 3.

Figure 3 is a side elevational view of the tongs in unlocked position.

Figure 4 is a perspective view of one tong arm.

Figure 5 is an end view of the tongs in closed position.

The tongs are indicated in general by the letter A. The tongs include two tong arms 10 and 11 which are pivotally connected at 12. For the sake of economy both of the tong arms may be identical in form and may be constructed as best shown in Figure 4 of the drawings.

Each tong arm, such as 11 shown in Figure 4, includes a channel shaped body which includes spaced sides 13 and 14 and a connecting base 15. This base 15 is preferably provided with longitudinally extending reinforcing rib 16 which projects outwardly from the base. The end of each channel shaped body is formed to provide a spoon shaped end 17. The material to be grasped is engaged between the spoon shaped ends of the two handle arms.

The opposite end of each channel shaped body is provided with projecting parallel sides 19 and 20 which are flush with the channel sides 13 and 14 and project therefrom. The sides 19 and 20 are provided with aligned apertures 21 and 22 for accommodation of the pivot 12. The side 19 is also provided with a slot 23 which may be straight in form or which may be U shaped as illustrated.

For the purpose of simplicity more complicated form of construction is illustrated but it should be understood that the device will function effectively if the upper portion of the U-shaped slot, as shown in Figure 4, could be eliminated.

The side 20 is provided with a notch 24 which forms a hooked shaped projection 25 about the notch. The notch 24 is so arranged as to register with the rearwardly extending arm 26 of the slot 23 of the corresponding pivoted arm 11 in the assembled form of the tongs. In other words when the two arms 10 and 11 are pivoted together into the position shown in Figure 1 the notch 24 and the lower arm 26 of the inverted arm 10 are in registry and in side by side relation.

A rivet 27 is provided with a head 29 which is located outwardly of the side 19 in assembly form of the construction and a short projecting inner end which is engageable in the notch 24. The rivet 27 is not tightened upon the side 19 and as a result it may slide freely throughout the length of the slot 23.

In the construction of the device the two arms 10 and 11 are placed with the pivot aperture in alignment and the rivet 12 is inserted in these apertures 21 and 22 of both arms. A short rivet 27 is placed through the slot 23 of one of the arms and anchored in place so that it will slide in the notch. A spring 30 encircles pivot 12 and tends to urge the arms 10 and 11 apart at their free ends. Pivotal movement of the arms is limited by the engagement of certain of the sides 19 and 20 with the opposite arm.

When the tongs are used the spoon ends thereof are normally inclined downwardly from the handle ends. This is particularly true when the tongs are used to pick up food articles such as potatoes or other vegetables, such as ears of corn. The tong arms are normally held together with the fingers to engage the article therebetween.

When it is desired to store the tongs they are held in an upright position with the hinged ends of the arms extending downwardly. The rivet 27 then slides down the slot 23 and engages in the notch 24 beneath the hooked projection 25. If the compressing force of the fingers against the arms is released while the tongs are held in this position the spring 30 will tend to spread the arms apart and will cause the rivet 27 to bind against the hook projection 25. The tongs will then remain locked during storage and the like. When it is desired to use the tongs, they are merely held with the hinged ends of the arms uppermost and spring pressure of the fingers is exerted against the arms. The rivet 27 will then slide by gravity out of engagement with the hooked projection 25 and the rivet will no longer prevent separation of the tong arms.

If it is desired to hold the rivet from locking in any position of the tongs, the rivet is manually moved to the arm 31 of the slot 23. This arm 31 is the slot arm nearest to the connecting base 15 of each tong arm. When in this portion of the slot the rivet will not engage in the notch 24 regardless of the manner in which the tongs are held. In usual practice the portion 31 of the notch is somewhat narrower than the portion 26 thereof and as a result the rivet 27 frictionally engages and is held in place by friction until manually released. The slot arm 26 is farther from the base 15 of each tong arm than the slot arm 31.

In accordance with the patent statutes, the principles of construction and operation of the tongs have been described and while it has been endeavored to set forth the best embodiments thereof, it is desired to have it understood that obvious changes may be made within the scope of the following claims without departing from the spirit of the present invention.

I claim:

1. Tongs including a pair of tong arms each having an end of channel shaped cross section including parallel sides and a connecting base, said arms being arranged in opposed relation with the connecting bases of said arm ends in spaced relation and the sides in overlapping parallel relation, each side of one arm being substantially in surface contact with a corresponding side of the other arm, pivot means extending through the overlapping sides with the pivot axis normal to the planes of the sides, said arms being pivotal between substantially parallel relation to diverging relation, a U-shaped slot in one side of one of said arms with the arms of the slot directed toward the pivot means, a hook portion in the adjacent side of the other arm defining a notch registrable with the end of one slot arm when said arms are in one pivotal position, and means slidable in said slot engageable in, and disengageable from, said notch of said hook portion when said tong arms are in said one position, the other arm of said slot being narrower than said one slot arm, said slidable means being frictionally engageable in said other slot arm when out of engagement with said notch to hold said slidable means in inoperative position.

2. The structure of claim 1 and in which said notch is registrable with one end of said one slot arm when said tong arms are substantially parallel.

3. The structure of claim 1 and in which said slidable means is freely slidable in said one slot arm by force of gravity.

References Cited in the file of this patent

UNITED STATES PATENTS

| | | |
|---|---|---|
| 874,547 | Shaw | Dec. 24, 1907 |
| 2,201,566 | Voelker | May 21, 1940 |
| 2,525,678 | Hout | Oct. 10, 1950 |
| 2,557,846 | Ste. Maria | June 19, 1951 |
| 2,602,001 | Knapp | July 1, 1952 |